C. E. BURWELL & F. G. BATES.

Friction-Clutch.

No. 8,518 Reissued Dec. 10, 1878.

Witnesses.

Henry Howson Jr.

Henry Smith

Inventors.

Charles E. Burwell and

Frank G. Bates by their Attorneys

Howson and Sons

UNITED STATES PATENT OFFICE.

CHARLES E. BURWELL, OF MILLER'S FALLS, MASSACHUSETTS, AND FRANK G. BATES, OF PHILADELPHIA, PENNSYLVANIA.

IMPROVEMENT IN FRICTION-CLUTCHES.

Specification forming part of Letters Patent No. 157,063, dated November 24, 1874; Reissue No. 8,518, dated December 10, 1878; application filed November 27, 1878.

*To all whom it may concern:*

Be it known that we, CHARLES E. BURWELL, of Miller's Falls, Massachusetts, and FRANK G. BATES, of Philadelphia, Pennsylvania, have invented certain Improvements in Friction-Clutches; and we do hereby declare the following to be a full, clear, and exact description of the same.

The main object of this improvement in friction-clutches is to apply friction all around, or as nearly as possible all around, the hub of a pulley or wheel, by combining therewith an annular friction device and mechanism for causing the same to circumferentially embrace the outer surface of the said hub, thereby insuring quicker action than when applied to the rim, owing, it is believed, to the fact that the hub turns at less velocity than any part of the pulley outside the hub.

Figure 1:
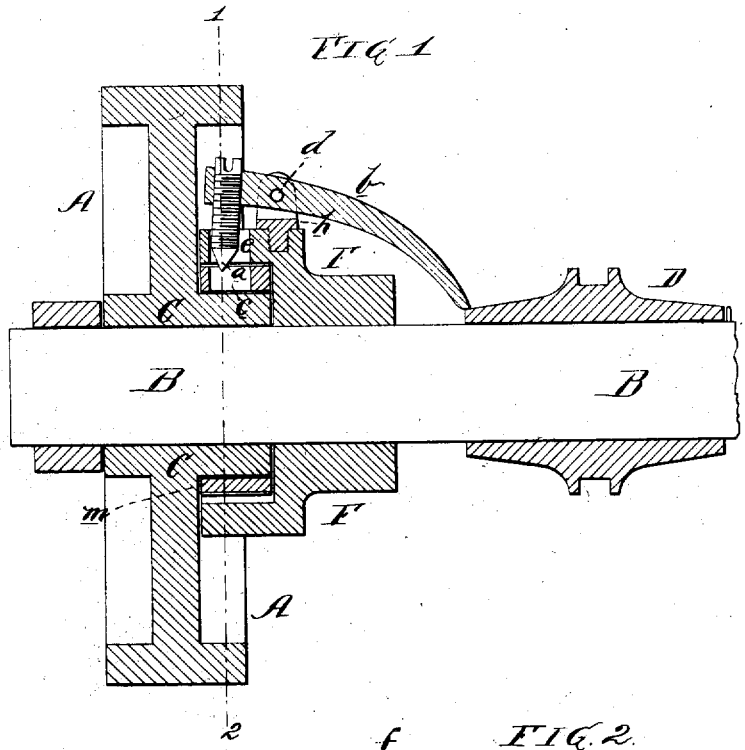
Figure 2:
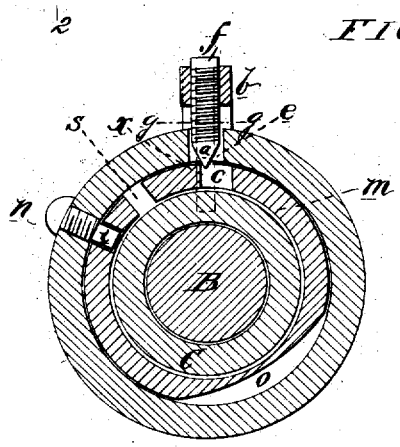

In the accompanying drawing, Figure 1 shows part of a shaft with pulley and clutch in section, and Fig. 2 a transverse section on the line 1 2.

B represents a shaft, and A a loose pulley on the same, the hub C of this pulley being contained within a recess in a false hub or carrier, F, which is firmly secured to the shaft. The medium through which friction is applied circumferentially to the hub, as shown in the drawing, is a spring-ring, *m*—that is, a ring admitting of being contracted to the hub, but self-expanding to its normal condition. This ring, the ends of which are a short distance apart, as shown at *s*, is also contained in a recess of the carrier F, and is connected to the same by a screw-stud, *n*, the threaded portion of the latter being screwed into the carrier, and its smooth end *i* fitting freely into a hole in the ring, so as to present no impediment to the contraction and self-expansion of the same.

A lever, *b*, is pivoted at *d* to a stud, *h*, on the carrier F, and to a threaded hole in the short arm of this lever is adapted an adjustable screw, *f*, which protrudes into the opening *e* in the carrier, and which has a conical or wedge-shaped end, *a*, for entering the hole *c* of the spring-ring, which hole is a little to one side of the said opening *e*. The ring may be reduced in thickness at one or more points, *o*, so as to be more easily contracted.

On the shaft B there is a sliding sleeve, D, which can be moved to and fro on the said shaft by any suitable appliances, the end of the long arm of the lever *b* being in contact with the tapering portion of this sleeve, so that when the latter is moved in the direction of the arrow the long arm of the lever will be turned away from the shaft, and the short arm toward the same, and the conical end *a* of the screw *f* will bear against the edge *x* of the hole *c* in the spring-ring, and, by a wedge-like action, will contract the said ring and cause it to embrace the hub C of the pulley, thereby creating such friction all around, or nearly all around, the hub that the pulley must necessarily revolve with the carrier or false hub F, that part of the screw *f* which is contained in the opening *e* of the carrier and in the hole *c* of the spring-ring being the medium through which rotary motion is communicated from the carrier to the ring, and thence, owing to the friction of the latter on the hub C, to the pulley.

During the movement of the sleeve D in a direction contrary to that pointed out by the arrow (toward the position shown in Fig. 1) the lever will move to its former position, for, owing to the inherent tendency of the spring-ring to recoil and expand, the edge *x* of the hole in the spring, acting forcibly against the wedge-like end of the screw *f*, will tend to force that screw outward to an extent permitted by the receding sleeve, so that when the latter has reached the position Fig. 1 the pulley will be free from the friction of the ring, and will consequently be loose on the shaft.

As shown in Fig. 1, the opening *e* in the carrier and the hole *c* in the ring are made larger than the screw *f*, to permit the free movement of the latter in the arc of a circle, of which the pivot-pin *d* is the center; but in practice I prefer to make the screw *f* in two parts, the one part which passes through the lever being the screw proper, and extending as far as the line *g*, Fig. 2, the other part from this line being a simple short pin, fitting snugly, but so as to slide freely, in the opening *e* of the carrier, and having a wedge-like termination to enter the hole in the spring-ring, the end of the screw being somewhat rounded, so as to move freely against the head of the pin.

The screw *f* may be so adjusted in the short arm of the lever that its conical end, or the wedge-like pin on which the screw bears, shall have the desired effect of contracting the spring-ring to the hub in obedience to the action of the tapering portion of the sleeve on the lever.

A protuberance or projection on the ring *m* for the wedge to act upon would answer the same purposes as the hole *e* in the ring; but we prefer to make the ring in the manner described.

We claim as our invention—

1. A friction-clutch in which the hub of a pulley or wheel is combined with an annular friction device and with mechanism for applying friction circumferentially to the said hub through the medium of the said device, substantially as set forth.

2. In a friction-clutch, the combination of the hub of a pulley or wheel with a spring-ring and with mechanism whereby the said ring may be contracted to the said hub and released therefrom, substantially as set forth.

3. The combination of a carrier or false hub secured to a shaft and a spring-ring, *m*, connected to the said carrier, with a screw or pin passing through the carrier, and having a tapering or wedge-shaped end adapted to a projection or hole in the ring, and with mechanism for operating the said pin and causing the same to contract the said spring-ring, all substantially as set forth.

4. The combination of a carrier secured to a shaft, a spring-ring connected to the said carrier, a lever arranged to be operated by a sleeve on the shaft, and an adjustable pin carried by the lever, and having a conical or wedge-shaped end for operating on the ring, all substantially as set forth.

5. The combination of the said carrier, spring-ring, and lever with a wedge-shaped pin arranged to slide in the carrier and to be acted on by a screw carried by the lever, all substantially as specified.

6. The combination of the carrier, a spring-ring, and a screw, *n*, by which the said ring is loosely connected to the carrier, substantially as described.

In testimony whereof we have signed our names to this specification in the presence of two subscribing witnesses.

CHARLES E. BURWELL.
FRANK G. BATES.

Witnesses:
F. M. THOMPSON,
P. M. FITZGERALD.